United States Patent [19]

Chin

[11] 4,291,982

[45] Sep. 29, 1981

[54] MULTI-PURPOSE SURVEYING INSTRUMENT

[76] Inventor: Hsü S. Chin, No. 84, Lane 27, Yi Chiao St., Jia Yi, Taiwan

[21] Appl. No.: 31,474

[22] Filed: Apr. 19, 1979

[51] Int. Cl.³ ............................................... G01C 9/18
[52] U.S. Cl. .................................... 356/249; 356/147
[58] Field of Search ................... 356/72, 73, 140, 147, 356/249, 255

[56] References Cited

U.S. PATENT DOCUMENTS 1,945,323  1/1934  Lewis .............................. 356/147 X
3,049,963  8/1962  Parsons, Jr. ..................... 356/147 X Primary Examiner—John K. Corbin
Assistant Examiner—Matthew W. Koren
Attorney, Agent, or Firm—LeBlanc, Nolan, Shur & Nies

[57] ABSTRACT

This invention relates to a multi-purpose surveying instrument, more specifically a composite instrument which can be used as a theodolite, a level surveying instrument, and a plane table, and which provides a precision surveying instrument needed in general architecture, civil engineering and the like.

8 Claims, 8 Drawing Figures

FIG. 5
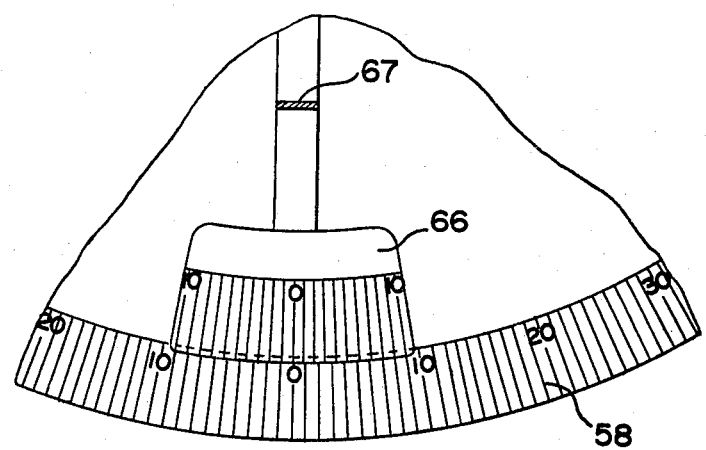
FIG. 6A
FIG. 7
FIG. 6B
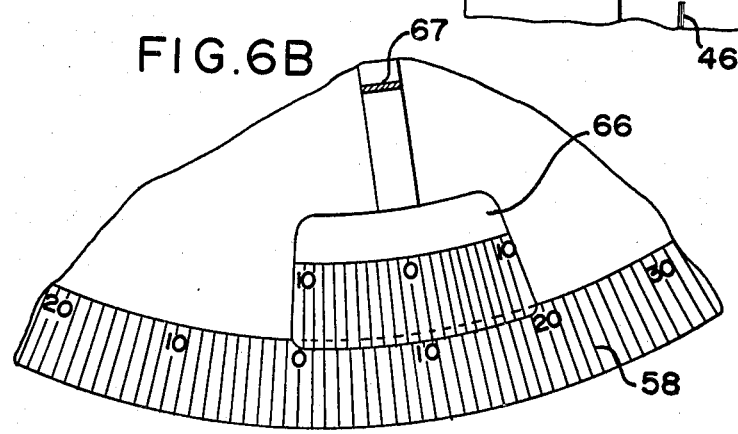

MULTI-PURPOSE SURVEYING INSTRUMENT

BACKGROUND OF THE INVENTION

It is commonly known that most conventional surveying instruments have limited applications; for example, a level surveying instrument is only good for level surveying, and a theodolite is only good for surveying angles or inclinations. They not only lack versatility but also lack efficiency because of such essential drawbacks as:

(1) Conventional theodolites or plane boards (that can be used only for surveying angles or levels) are heavy. In surveying operations there is a need for several different types of instruments to be used in combination, which is both inconvenient. Furthermore, these instruments tend to break down easily.

(2) When surveying an angle, the angle can not be measured quickly, and a slow adjustment by hand is required before the angle can be measured.

(3) The manufacture of each type of conventional instrument is complicated and the cost is very high; therefore, it is uneconomical to use conventional instruments.

(4) Theodolite, level surveying instrument and plane boards are hard to use by field engineers in architecture, civil engineering, plant building and irrigation work, thus the application of these three instruments is limited.

SUMMARY OF THE INVENTION

Having been engaged in actual field surveying operation for many years, the inventor realized the inefficiency and inconvenience of conventional surveying instruments, and has developed this invention. It is the main object of this invention to eliminate the aforesaid drawbacks and to provide a multi-purpose, composite surveying instrument that can be easily manufactured at low cost. It is another object of this invention to provide an instrument with such features and functional capabilities as that of a theodolite, level surveying instrument and plane board. It is still another object of this invention to provide an instrument that offers various surveying means needed by field surveying engineers in general architecture, civil engineering and the like, and with which accurate surveys can be performed.

BRIEF DESCRIPTION OF THE DRAWINGS

The principle, construction and operation of the instrument of this invention will be understood more fully from the following description taken in conjunction with the accompanying drawings in which:

FIG. 5 is a partially enlarged view of the graduations on the protractor and vernier device of the embodiment of this invention.

FIGS. 6A and 6B are schematic views of the embodiment of this invention being directly laid on the object to be surveyed for surveying inclination.

FIG. 7 is a schematic view of the embodiment of this invention in use for surveying perpendicularity.

DESCRIPTION OF THE PREFERRED EMBODIMENT

Figure 1:
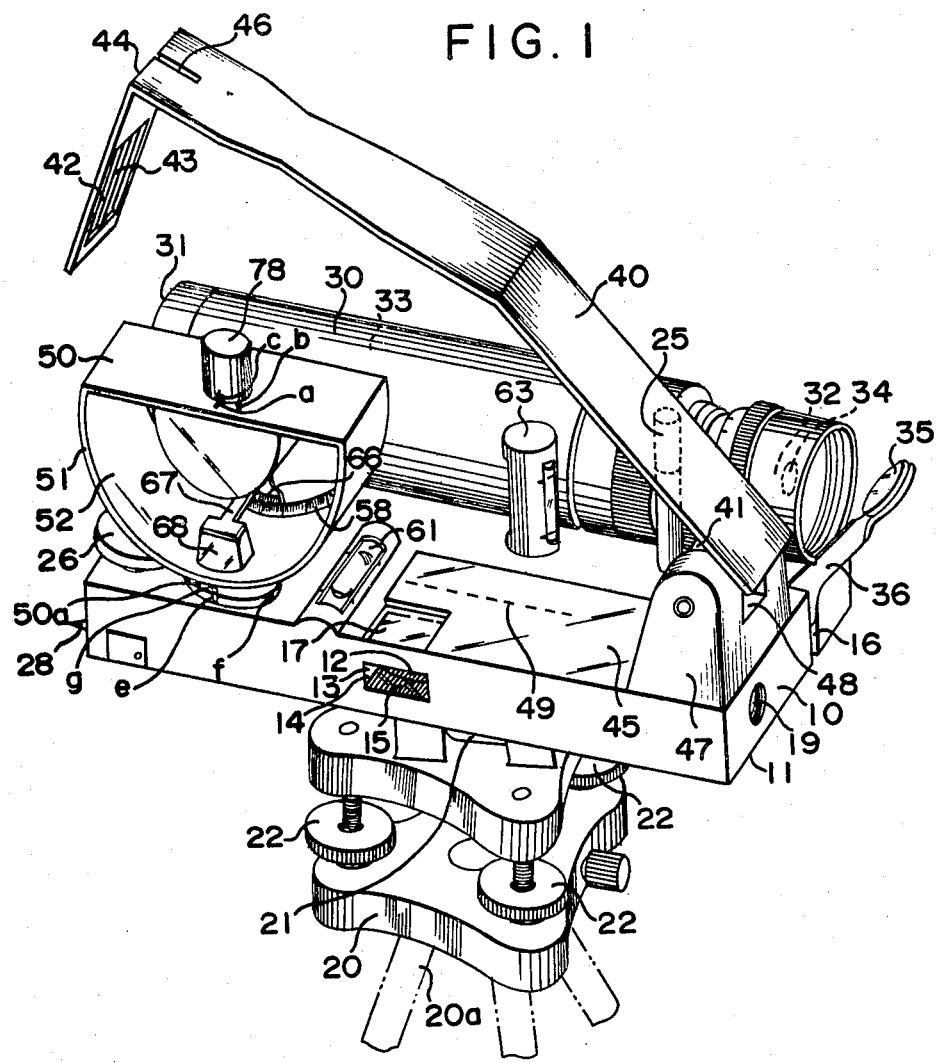
FIG. 1 is a composite, perspective view of the embodiment of this invention.
Figure 2:
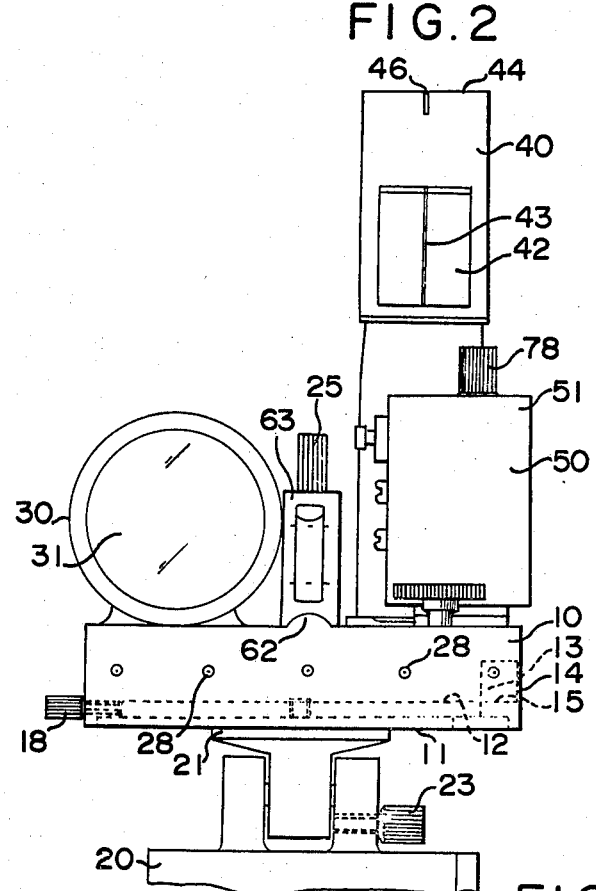
FIG. 2 is a front view of the embodiment of FIG. 1.

As shown in FIGS. 1 and 2, the main part of this invention is a horizontal base 10 whose bottom surface 11 is a flat, standard plane. At the center portion of the bottom surface there is provided a cylindrical recess with its axis perpendicular to the bottom surface 11 to receive a horizontal scale 12 with a shaft, said horizontal scale having protractor-like graduations whereon. A rectangular hole 13 is provided in the left side surface of the horizontal base 10 with a transparent glass 14 mounted at the gate thereof, and with the bottom surface parallel with the surface of said horizontal scale 12 (i.e., in the same plane), the bottom surface of rectangular hole 13 having a vernier 15 comprising a multiple number of equally spaced graduations, whose design principle will be explained later. The bottom part of the horizontal scale 12 is provided with screw-threaded holes with which the horizontal scale 12 can be fixed onto the upper member of an adjusting base 20 which in turn can be mounted on a tripod (as shown by imaginary lines 20a).

At proper positions on the top side of the horizontal base 10 are disposed and fixed a telescope 30, a sight pole 40, a plane mirror 45, a vertical scale 50 and three level tubes 61, 62 and 63 (one of the three, 63, being perpendicular to the horizontal base 10, whose function will be explained later). The internal construction of the telescope 30 is the same as that which is used in conventional surveying instruments, comprising an object piece 31 that produces a real image, an eye piece 32 that magnifies the real image and makes it visible to the naked eye, and a pair of cross hairs 33 for sighting the real image said telescope being fixed on the horizontal base 10 with the horizontal line of cross hairs being parallel with the bottom surface 11. Furthermore, a plate member with view hole 34 is attached to the rear face of the eye piece 32 for assisting observation in the survey operation. At the further rear of the eye piece 32 a reflection mirror 35 is mounted on a pivotal lever 36, said pivotal lever 36 being pivotally connected at its lower end by a pivot pin in the slot 16 in the horizontal base 10 so that it can pivot forward and backward to enable a proper adjustment of distance between the eye piece and the reflection mirror.

The purpose of having the reflection mirror 35 therein is to enable the surveyor, when surveying an angle, to observe the object that is reflected in the mirror 35 while reading the scale. The sight pole 40 is made of a flat metal plate and formed properly, having an opening 42 at the front end in which a sight piece 43 for surveying perpendicularity is inserted, while in the vicinity of the bent line 44 of the sight pole 40 a sight slot 46 is provided to coincide in a straight line with the sight piece 43. The rear end of the sight pole 40 is provided with a sleeve 41 which is pivotally connected to the fulcrum 47, so that the sight pole can either rotate forward or backward in the desired direction for use in survey operations, or can be folded down when not in use. The sight pole fulcrum 47 is fixed onto the horizontal base 10, and the plane mirror 45 is bonded horizontally to the upper surface of the horizontal base 10 closely against the sight pole fulcrum 47, said plane mirror having thereon a sight line 49 composed of a dotted line which is so disposed to coincide with the image the aforesaid sight piece 43 reflected in the plane mirror in a straight line when the sight pole is raised and the sight piece 43 is moved atop the plane mirror, said straight line constituted by the sight piece 43 and the sight line 49 being always perpendicular to the horizon when the bottom surface 11 of the horizontal base 10 is set level. To facilitate the surveying of horizontal angles a magnifying glass 17 is mounted on a rectangular section provided at a corner of the plane mirror 45 on the upper surface of the horizontal base 10, the rectangular section being so disposed that the magnifying glass mounted thereon magnifies the graduations of the horizontal scale 12 and that of vernier 15 underneath.

Figure 3:
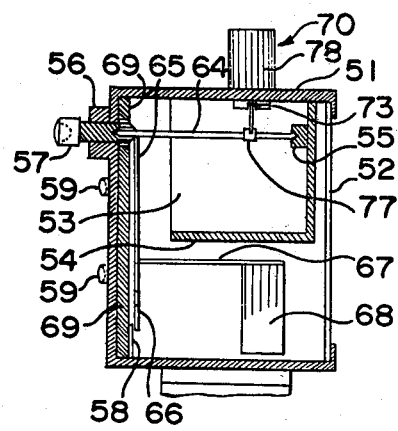
FIG. 3 is a sectional view of the vertical scale of the embodiment of this invention.

The vertical scale 50, installed on the horizontal base 10 with its swivel axis perpendicular to the bottom surface 11, can be rotated freely in a horizontal plane that is parallel with the bottom surface 11 of the horizontal base 10. The construction of said vertical scale 50 is as shown in FIGS. 1, 2 and 3, externally the vertical scale comprising a hollow, semi circular outer case 51 with a semi-circular, transparent glass 52 mounted at the opening thereof. Another semi-circular case 54 having an opening 53 and a support flange 55 attached to the inner wall thereof is disposed alongside the glass 52, in the interior of the outer case 51. A flange 56 having a screw-threaded hole therein is attached to the outer wall of the outer case 51, said flange 56 having a screw sleeve 57 screwed therein through a cover plate 69 to face said support flange 55, said cover plate 69 being connected with a protector having a plurality of equally spaced graduations, and fixed to the inner wall of the outer case with bolts 59—59. The support flange 55 and the screw sleeve are provided with cone shaped recesses on their respective tips in order to receive properly therebetween a round steel shaft 64 which has smooth yet sharp points at both ends and a pendulum 65 connected thereon at a proper position, said pendulum 65 having at the lower end a vernier member 66 which partially overlaps the upper portion of the graduations of the protractor 58 when observed straight from the front, yet leaving a small gap with the protractor 58 when observed from the side to avoid a decrease in sensitivity of the movement of pendelum because of contact between the venier member 66 and the protractor 58 when the vernier member 66 sways.

The pendulum 65 is further provided with a magnifying glass 68 which is mounted at the front end of a bar 67 connected to the pendulum and protruding horizontally from the pendulum 65, said magnifying glass 68 moving with the pendulum 65 and magnifying the graduations on the vernier 66 and the protractor 58.

Figure 4:
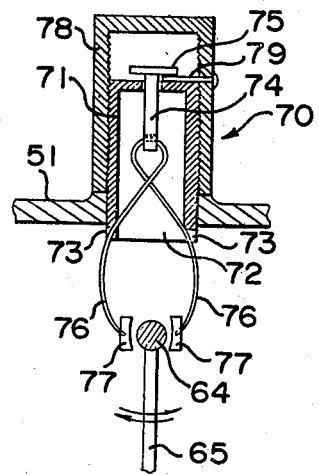
FIG. 4 is a sectional view of the sway control device of the embodiment of this invention.

Round steel shaft 64 requires proper adjustment after installation between the two cone shaped recesses at the support flange 55 and the screw sleeve 57. To make the adjustment, first turn the screw sleeve 57 slowly inward until the two sharp ends of the round steel shaft 64 reach certain points in the two cone shaped recesses yet enabling the vernier member 66 of the pendulum 65 to sway freely and sensitively with the magnifying glass 68, then wait for the vernier member 66 to stop swaying naturally. If the O mark on the vernier 66 coincides with the O mark for perpendicularity on the protractor 58 (as shown in FIG. 5), the adjustment is completed and the instrument is calibrated. Finally, turn the screw sleeve 57 tight. In order to avoid the delay in survey operations incurred by the restless sway of the vernier member 66 due to its oversensitivity, a sway control device 70 is provided around the round steel shaft 64 (see FIGS. 1 through 4.), The sway control device 70 comprises a hollow sleeve 71, a lifting rod 74, a pin of fork like resilient steel wires 76—76, rubber members 77—77, an adjusting nut 78 and a pin 79. The hollow sleeve 71 is fixed on top of the outer case 51, said hollow sleeve 71 having a screw thread on the outer surface (as shown in FIG. 4) and an open end 72 downward, said open end 72 having two slots 73—73 provided at the sleeve edge to face each other, said hollow sleeve 71 being provided with a hole through its upper end plate. The lifting rod 74 has a flat disc like head 75, said lifting rod 74 being put through the hole in the top end plate of hollow sleeve 71 with its headside up. The lower end of said lifting rod 74 is provided with a hole. The resilient steel wire 76—76 is put through the hole at the lower end of aforesaid lifting rod 74, having two legs crossing each other and passing through slots 73—73, the two rubber members 77 being attached to the ends of said steel wire 76—76. The two rubber members 77 are disposed around the aforesaid round steel shaft 64. The adjusting nut 78 has a screw thread therein, being screwed over the sleeve 71 and the pin 79 is put through said adjusting nut 78, protruding inward to fit in between the head 75 of the lifting rod 74 and the top end plate of the sleeve 71.

If the vernier member 66 sways restlessly, the adjusting nut 78 can be turned counter clockwise, as shown in FIG. 1, to move the arrow mark C from the position a on the vertical scale 50 to position b. Thus the lifting rod 74 is lifted by the pin 79, pulling the steel wires 76—76 upward accordingly. When the steel wires 76—76 are pulled upward, the wires are restricted by the slots 73—73 and urged inward forcing the rubber members 77—77 to clamp on the round steel shaft 64, thus forcing the sway of the vernier member to slow down. Then the rubber members 77—77 ought to be released from the round shaft 64 before the vernier member comes to complete stop (i.e., turning the adjusting nut 78 back to the original position), and let the vernier member stop naturally at the point of the scale to be observed.

In order that the application of this invention as a multi-purpose surveying instrument may be more readily understood, so that the features and advantages thereof may be appreciated, the surveying methods and operations of this invention will be described in accordance with the most commonly used practice as follows.

1. When used in surveying inclinations (i.e. as a theodolite)

(a) First install the whole unit of this invention on the pivotal base 21 of the adjusting base 20, mount the horizontal base 10 on to the horizontal scale 12 (using the set screw 18, as shown in FIG. 2, to lock firmly), and tighten to prevent the horizontal base 10 from rotating. Loosen back the set screw 18 as soon as the whole unit of this invention is fixed firmly to the pivotal base 21 to allow the horizontal base 10 to rotate freely around the horizontal scale 12. This procedure is a prerequisite to the setting of the instrument of this invention on the tripod 20a.

(b) Adjust the horizontal screws 22—22, until the bubbles of the level tubes 61 and 62 come to stop at center respectively, to set the horizontal base 10 perfectly level.

(c) Rotate the horizontal base 10 and adjust the pivotal base 21 (loosen the set screw 23 for adjusting the inclination) and incline the telescope to find the object to be surveyed (hereafter simply called object). Set the cross hairs in telescope 30 to come into line with the object and take the reading on the vertical scale 50. The degree on the protractor pointed by the O line (i.e. O point) on the vernier indicates the degree of inclination being surveyed.

(d) The verniers of this invention (including those of vertical and horizontal scales) are provided with 10 equally spaced graduations. As shown in FIG. 5, which shows an enlarged view of the vernier of the vertical scale 50, there are 10 equally spaced, small graduations on each side of the O line, the total width of the 10 small graduations on each side being equal to the total width of 9 of the 10 small graduations on the protractor (i.e., the main scale), thus allowing a reading of accuracy of 0.1 degrees to be obtained; this, however, is well known and need not to discussed further.

(e) In the case that the inclination of the object is too steep (i.e., almost vertical), the whole unit of this invention can be mounted to the pivotal base 21 of the adjusting base 20 with the screw-threaded hole 19. Then, adjust the horizontal screws 22—22, until the bubbles in level 63 (previously in a vertical position, now horizontal) come to stop at center, and proceed with finding the object through the telescope 30. In this case the reflection mirror can be used for viewing the object. Thus, the inclination can be found out directly from the reading on the vertical scale 50.

2. When used in surveying a horizontal plane or horizontal angles (i.e. as a level surveying instrument)

(a) Set the bottom surface 11 of the horizontal base 10 perfectly level, as described in 1-(a).

(b) Set the cross hairs in the telescope to coincide with a fixed point and make the mark of it, then rotate the horizontal base 10 and set the cross hairs in the telescope to coincide with another fixed point and make the mark. The horizontal angle can be measured by observing the horizontal scale 12 through the magnifying glass 17 when the horizontal base 10 is rotated. A straight line between these two points is the horizontal line being surveyed. A third fixed point can be obtained in the same manner to define a horizontal plane together with the 2 fixed points already marked.

3. When used as a plane table, the operation will be best understood from the following description in accordance with the example taken herewith:

(a) Place the instrument of this invention on the object with the bottom surface 11 of the horizontal base 10 in direct contact with the object M, as shown in FIG. 6A.

(b) Observe the vernier of the vertical scale 50 and read the inclination angle of the object M whose surface is a slope. Note that the O line on the vernier falls between the 9th and 10th on the protractor 58 (see FIG. 6B) and further find that the graduation line on the protractor coincides with the 6th graduation line on the right hand side of O line of the vernier give 0.6 degrees. Thus the angle of inclination of the object M being surveyed is 9.6 degrees with respect to the horizon.

(c) In the case that the instrument of this invention is to be directly placed on an object with an uneven surface, with the bottom surface 11 of the horizontal surface to be set level, it can be accomplished by adjusting the adjusting rod 25 and the adjusting screw 26 on the horizontal base 10. The purpose and function of having these two adjusting members is the same as that of having the horizontal screw 22—22 on the adjusting base 20.

4. When used for surveying perpendicularity or vertical angles:

(a) First set the bottom surface 11 of the horizontal base 10 level.

(b) To survey the perpendicularity of an object at remote distance, as shown in FIG. 7, set the front end of the plane mirror toward the object and observe the image relected in the mirror. If the line Y of the object reflected in the mirror coincides with the sight line 49 on the mirror 45 together with the sight piece 43 on the sight pole in a straight line, the line Y of the object is perpendicular to the horizon; otherwise it is not.

(c) To survey a vertical angle, simply rotate the vertical scale 50 through 90 degrees (i.e., move the mark g on the swivel plate 50a under the vertical scale 50 which originally coincided with the mark e, to coincide with the mark f), and observe the vertical scale 50 to obtain the reading of the vertical angle being surveyed.

(d) The instrument of this invention is further provided with a plurality of projections 28—28 on the front side surface of the horizontal base 10 (as shown in FIGS. 1 and 2) for facilitating a close survey (short distance survey) by setting the horizontal base 10 directly in contact with the object, with said projections. To survey perpendicularity in this case, observe through the sight slot 46 the line to be surveyed to see if it coincides with the sight line 49 in a straight line.

It will be apparent from the foregoing that the the instrument of this invention is far superior to instruments of conventional construction.

What I claim is:

1. A multi-purpose surveying instrument for use in engineering surveying in general architecture, civil engineering and the like comprising a horizontal base, and an adjusting base that is provided underneath said horizontal base for adjusting the level or inclination of said horizontal base, said horizontal base having thereon a plurality of instruments including a telescope, a sight pole, a plane mirror, a vertical scale, a horizontal scale, and a plurality of level tubes disposed vertically and horizontally; the horizontal base having a flat and level bottom surface on which a cylindrical recess is provided with its axis vertical to said bottom surface, the horizontal scale being placed in said cylindrical recess with an axle, the telescope being fixed horizontally on the upper surface of the horizontal base, the sight pole having one end pivotally connected to the the horizontal base, the plane mirror being bonded horizontally to the upper surface of the horizontal base, the vertical scale being mounted on the horizontal base with a swivel axis perpendicular to the bottom surface of the horizontal base, said vertical scale being capable of rotating about said swivel axis.

2. A multi-purpose surveying instrument as in claim 1 wherein the telescope comprises an object piece, an eyepiece, a pair of cross hairs and telescope tube in which said object piece, eye piece and cross hairs are assembled, said telescope being fixed onto the horizontal base with horizontal line of said cross hairs parallel with the bottom surface of said horizontal base.

3. A multi-purpose surveying instrument as in claim 1 wherein the sight pole is provided with an opening in which a sight piece for surveying perpendicularity is inserted, and a sight slot in the vicinity of said opening to coincide with said sight piece in a straight line.

4. A multi-purpose surveying instrument as in claim 1 wherein the plane mirror is provided with a sight line composed of a dotted line, said sight line being so disposed as to coincide with said sight piece in a straight line which is always perpendicular to the horizon when the bottom surface of the horizontal base is set level.

5. A multi-purpose surveying instrument as recited in claim 1, wherein said vertical scale comprises:
   a hollow outer case having an outer wall;
   an inner case having an inner wall and fixed in said outer case;
   a round shaft having a first end rotatably supported by a screw sleeve screwed in said outer wall of said outer case and a second end rotatably supported by a support flange fixedly attached to said inner wall of said inner case;
   a protractor having a plurality of equally spaced graduations; and
   a pendulum having an upper end connected onto said round shaft and a lower end provided with a vernier member having a vernier scale cooperable with said graduations on said protractor.

6. A vertical scale of the multi-purpose surveying instrument as recited in claim 5 wherein said vernier member is provided with a magnifying glass.

7. A vertical scale of the multi-purpose surveying instrument as recited in claim 5, further comprising a sway control device for controlling the sway of said vernier member.

8. A vertical scale of the multi-purpose surveying instrument as recited in claim 7, wherein said sway control device comprises:
   a pair of rubber members disposed around said round shaft;
   a resilient wire having two legs crossed and the end of each leg connected to one of said rubber members; and
   a lifting rod connected to said resilient wire, and operable by an adjusting nut in such a way that when the adjusting nut is turned in one direction the lifting rod is pulled to cause said rubber members to move toward said round shaft, and when the adjusting nut is turned in the opposite direction, the lifting rod is pushed to cause said rubber members to move away from said round shaft.

* * * * *